United States Patent [19]
Hazelton et al.

[11] Patent Number: 6,043,965
[45] Date of Patent: Mar. 28, 2000

[54] LOW LOSS REVERSE BATTERY PROTECTION

[75] Inventors: Lawrence Dean Hazelton, Goodrich; Lance Ronald Strayer, Waterford, both of Mich.

[73] Assignee: General Motors Corporation, Detroit, Mich.

[21] Appl. No.: 09/032,501

[22] Filed: Feb. 26, 1998

Related U.S. Application Data

[60] Provisional application No. 60/066,272, Nov. 20, 1997.

[51] Int. Cl.$^7$ ........................................................ H02H 3/00
[52] U.S. Cl. ................................. 361/84; 361/82; 361/58; 361/115
[58] Field of Search ............................. 361/82, 84, 115, 361/56, 58

[56] References Cited

U.S. PATENT DOCUMENTS 5,519,557  5/1996  Kopera, Jr. et al. ..................... 361/84

*Primary Examiner*—Stephen Jackson
*Attorney, Agent, or Firm*—Vincent A. Cichosz

[57] ABSTRACT

A circuit having reverse battery protection includes a combination of an electrical load and an N-channel MOSFET inversely coupled in series with the load. The gate of the MOSFET is coupled to the high potential side of the electrical load. The series combination is powered by a DC voltage source. Positive polarity voltages enhance the MOSFET and provide for low loss conduction thus completing the series circuit whereas negative polarity voltages bias the MOSFET off thus providing a DC block by way of the intrinsic diode of the inversely coupled MOSFET. Gate to source voltage may be limited or controlled to prevent damage due to punch through effects at high positive voltages and to ensure turn-off of the MOSFET at negative polarity voltages.

28 Claims, 2 Drawing Sheets

LOW LOSS REVERSE BATTERY PROTECTION

This application claims priority from Provisional Application Ser. No. 60/066,272, filed Nov. 20, 1997.

TECHNICAL FIELD

The present invention is directed toward protection of electrical devices having a pair of terminals that are normally coupled across DC voltage of one polarity from undesirable results of the pair of terminals being coupled across DC voltage of the opposite polarity.

BACKGROUND OF THE INVENTION

Many electrical devices are intolerant of application of DC voltage at a polarity opposite that which is normally applied to the device. Commonly, this opposite polarity condition may be referred to a reverse battery application though the opposite polarity voltage supply may actually originate from some source other than a battery or normal DC voltage supply. Protection from this condition is commonly referred to as reverse battery protection. Many devices will suffer irreversible damage from reverse battery application.

It is known to connect a diode between the negative terminal of a device and a DC supply negative terminal, the diode being oriented to block current flow through the device in reverse battery conditions by way of reverse bias blocking. Similarly, it is also known to connect a diode between the positive terminal of a device and a DC supply positive terminal, the diode being oriented to block current flow through the device in reverse battery conditions by way of reverse bias blocking. When operating with normal DC voltage polarity these arrangements suffer from intrinsic energy loss associated with the forward biased diode voltage drop. The actual DC voltage seen by the device is also reduced by the forward biased diode voltage drop.

It is also known to use a MOSFET driver between the positive terminal of a device and a DC supply positive terminal as a high side voltage switch and reverse battery protection. In this arrangement the device is generally wired to ground at the negative terminal, and when the driver is biased on the positive voltage is coupled to the positive terminal thereby coupling the device across the DC voltage at the normal polarity. The driver, when not biased on, provides reverse battery protection to the device. A major disadvantage to this arrangement is the necessity of a charge pump circuit to actively bias the driver conductive by ensuring the gate voltage exceeds the source voltage if the driver is an N-channel MOSFET. Substitution of a P-channel MOSFET, while eliminating the need for a charge pump to bias the driver conductive, may be impractical due to the increased size and cost of P-channel MOSFETs relative to N-channel MOSFETs. Additionally, P-channel MOSFETs are characterized by higher on resistances compared to N-channel MOSFETs which disadvantageously results in higher energy losses when biased conductive.

SUMMARY OF THE INVENTION

The present invention overcomes the various shortfalls of the related art by providing an N-channel MOSFET in inverse arrangement between the negative terminal of the device and ground wherein the N-channel MOSFET is passively biased conductive when the voltage across the positive terminal of the device and ground is characterized by positive polarity. Otherwise, when the voltage across the positive terminal of the device and ground is characterized by negative polarity the N-channel MOSFET is biased non-conductive. In the non-conductive state biased by a reverse battery condition, the intrinsic parasitic diode across the source and drain of the N-channel MOSFET is reverse biased and blocks reverse current flow through the device.

DESCRIPTION OF THE PREFERRED EMBODIMENT

Figure 1:
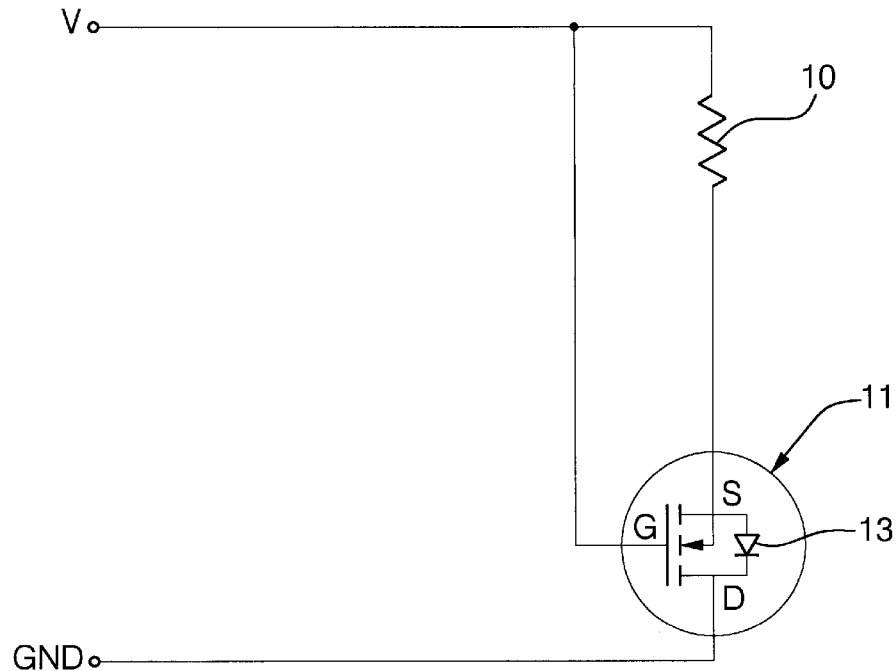
FIG. 1 illustrates a first embodiment of the present invention.

FIG. 1 illustrates a first embodiment of the present invention wherein relatively low supply voltages are expected. Low supply voltages in this regard means normal polarity voltages less than tolerable gate to source voltage of the N-channel MOSFET. The tolerable voltage is generally around 20 volts. Gate to source voltage in excess of the tolerable level may result in irreversible gate damage caused by punch through effects. In the embodiment of FIG. 1, the load 10 is shown as a simple resistive load having one terminal coupled to the normally high DC voltage supply terminal V. The other terminal of load 10 is coupled to the source S of N-channel MOSFET 11. The drain D of MOSFET 11 is coupled to the normally low DC voltage supply terminal GND. The gate G of MOSFET 11 is also coupled to the normally high DC voltage supply terminal V. The intrinsic parasitic diode 13 coupled between source S and drain D has its anode coupled to the source S and its cathode coupled to the drain D.

In operation, when the DC voltage supply terminal V is positive with respect to the DC voltage supply terminal GND the gate G of MOSFET 11 is at a higher potential than the source S which biases MOSFET 11 conductive. In the conductive state, MOSFET 11 has a source S to drain D voltage drop which is a function of the MOSFET on resistance which can be significantly lower than that of a forward biased diode. When the DC voltage supply terminal V is negative with respect to the DC voltage supply terminal GND the gate G and source S are substantially equivalent which biases MOSFET 11 non-conductive. Since MOSFET is placed in inverted fashion, the intrinsic parasitic diode 13 is reverse biased when the DC voltage supply terminal V is negative with respect to the DC voltage supply terminal GND and it is effective as a block against current flow through the load 10.

Figure 2:
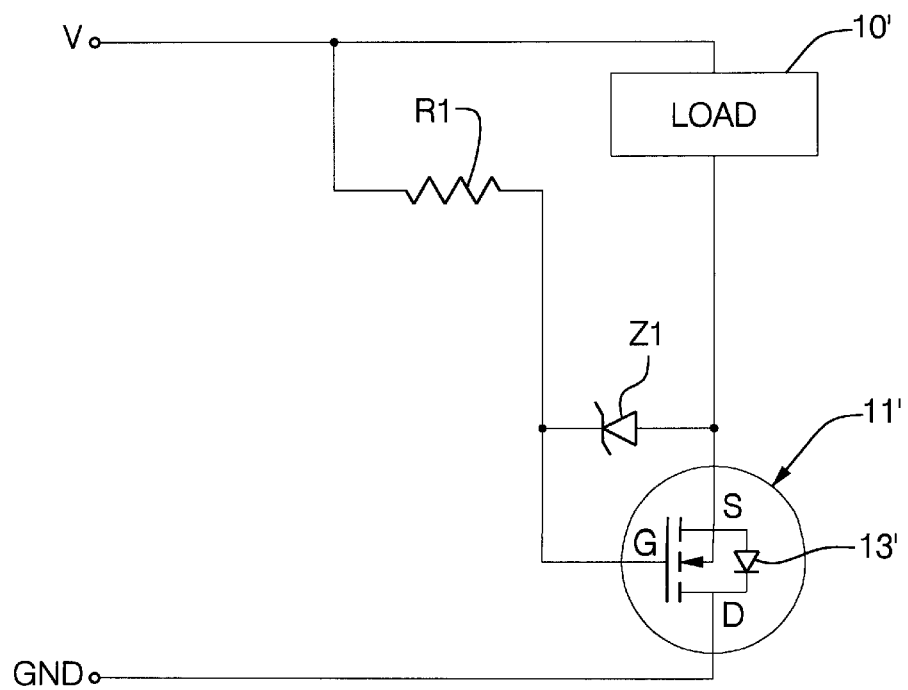
FIG. 2 illustrates a second embodiment of the present invention.

FIG. 2 illustrates a second embodiment of the present invention wherein relatively high supply voltages are expected. High supply voltages in this regard means normal polarity voltages greater than tolerable gate to source voltage of the N-channel MOSFET. In the embodiment of FIG. 2, the load 10' is shown in block format with one terminal coupled to the normally high DC voltage supply terminal V. The other terminal of load 10' is coupled to the source S of N-channel MOSFET 11'. The drain D of MOSFET 11' is coupled to the normally low DC voltage supply terminal GND. The intrinsic parasitic diode 13' coupled between source S and drain D has its anode coupled to the source S and its cathode coupled to the drain D. In the foregoing regard, the embodiment of FIG. 2 is the same as that of the first embodiment of FIG. 1.

To protect MOSFET 11' from irreversible damage due to excessive gate to source voltage levels, the gate G of MOSFET 11' is coupled through resistor R1 to the normally high DC voltage supply terminal V, and Zener diode Z1 is coupled across the gate G and source S to clamp the gate to source voltage less than the tolerable gate to source voltage. Z1 is chosen with a breakdown voltage less than the tolerable gate to source voltage. R1 is chosen to limit the current through Z1.

In operation, when the DC voltage supply terminal V is positive with respect to the DC voltage supply terminal GND, the gate G of MOSFET 11' is at a higher potential than the source S which biases MOSFET 11' conductive. When the gate G to source S voltage reaches the breakdown voltage of the Zener diode Z1, which voltage is less than the tolerable gate to source voltage, the Zener diode clamps the gate G to source S voltage below the tolerable gate to source voltage. When the DC voltage supply terminal V is negative with respect to the DC voltage supply terminal GND, the gate G and source S are substantially equivalent which biases MOSFET 11' non-conductive. Since MOSFET is placed in inverted fashion, the intrinsic parasitic diode 13' is reverse biased when the DC voltage supply terminal V is negative with respect to the DC voltage supply terminal GND and it is effective as a block against current flow through the load 10'.

Figure 3:
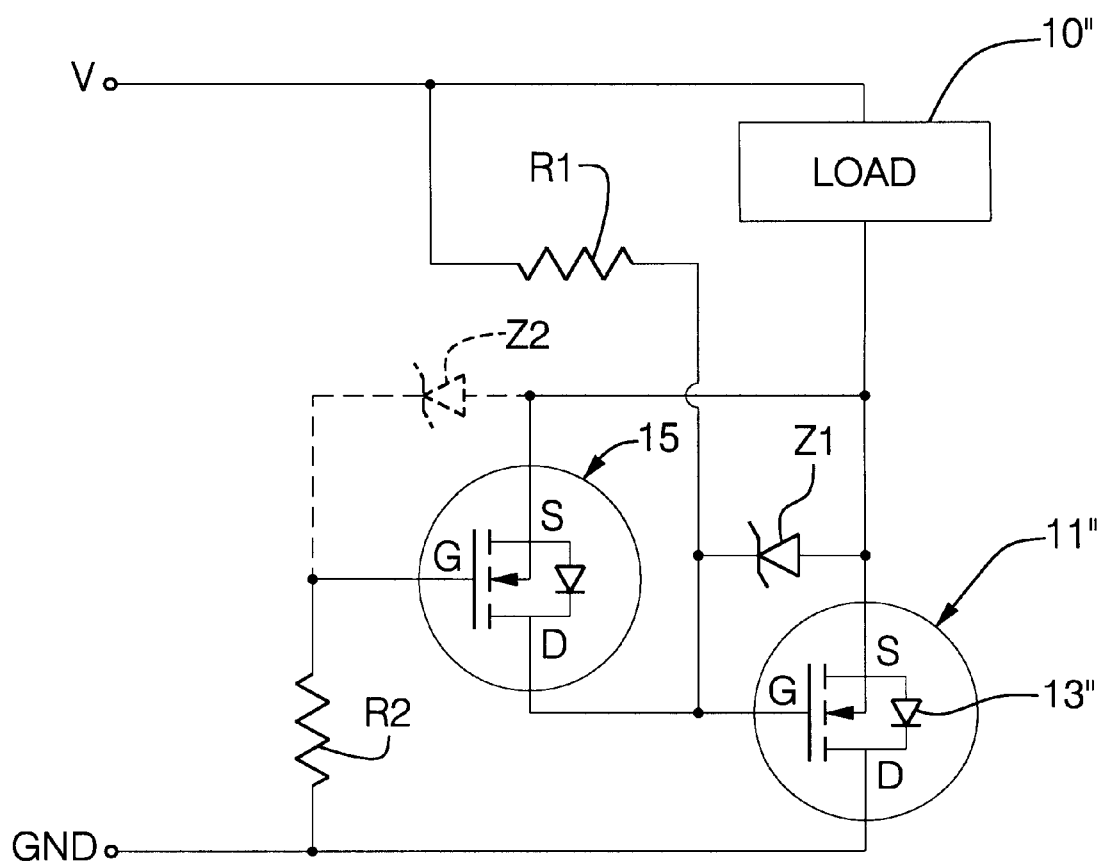
FIG. 3 illustrates a third embodiment of the present invention.

FIG. 3 illustrates a third embodiment of the present invention which in addition to the foregoing features described with respect to the embodiments of FIGS. 1 and 2 ensures that the reverse battery protection afforded by the MOSFET is not compromised by external influences. In the embodiment of FIG. 3, the load 10" is also shown in block format with one terminal coupled to the normally high DC voltage supply terminal V. The other terminal of load 10" is coupled to the source S of N-channel MOSFET 11". The drain D of MOSFET 11" is coupled to the normally low DC voltage supply terminal GND. The intrinsic parasitic diode 13" coupled between source S and drain D has its anode coupled to the source S and its cathode coupled to the drain D. In the foregoing regard, the embodiment of FIG. 3 is the same as that of the first and second embodiments of FIGS. 1 and 2.

It is recognized that reactive loads store energy which may result in unknown voltages appearing at the load terminals. It is also recognized that the voltage at the terminals of the load may also be influenced by other devices which may be coupled to the load 10". To ensure that the gate G to source S voltage is held near zero which biases MOSFET 11" non-conductive during reverse battery conditions, a second solid state switch 15, preferably a MOSFET but alternatively a bipolar transistor, is coupled into the circuit. MOSFET 15 has its source S coupled to the source of MOSFET 11", its drain D coupled to the gate of MOSFET 11", and its gate G coupled through resistor R2 to the drain of MOSFET 11". By using MOSFET device for switch 15, the entire circuit, with the exception of the load, is most readily fabricated as a single three-pin integrated circuit using well known techniques.

In operation, resistor R2 in conjunction with the gate capacitance of MOSFET 15 provides some transient suppression for the gate G of MOSFET 15. During reverse battery conditions, R2 will enhance MOSFET 15 which will short the gate G and source S of MOSFET 11".

In addition to the circuit described thus far with respect to FIG. 3, a Zener diode Z2 may also be coupled across the gate G and source S of MOSFET 15 as illustrated to provide for gate protection of MOSFET 15 in a manner similar to that described with respect to Zener diode Z1, however with respect to excessive reverse battery condition voltages.

We claim:

1. A circuit including an electrical load normally powered by voltage of a first polarity across a pair of circuit terminals, said circuit effective for preventing current flow through the electrical load caused by voltage of a second polarity opposite the first polarity across the pair of circuit terminals, the improvement comprising:

said electrical load having high and low potential terminals, said high potential terminal coupled to the one of the pair of circuit terminals at a higher potential than the other of the pair of circuit terminals when voltage of the first polarity is across the pair of circuit terminals; and, a first N-channel MOSFET having a source coupled to the low potential terminal of the electrical load, a gate coupled to the high potential terminal of the electrical load, and a drain coupled to the one of the pair of circuit terminals at a lower potential than the other of the pair of circuit terminals when voltage of the first polarity is across the pair of circuit terminals.

2. A circuit as claimed in claim 1 further comprising:

means effective to limit the gate to source voltage to a predetermined voltage when voltage of the first polarity is across the pair of circuit terminals.

3. A circuit as claimed in claim 1 further comprising:

means effective to limit the gate to source voltage to a voltage that biases said first N-channel MOSFET off when voltage of the second polarity is across the pair of circuit terminals.

4. A circuit as claimed in claim 1 further comprising:

means effective to limit the gate to source voltage to a predetermined voltage when voltage of the first polarity is across the pair of circuit terminals, and to limit the gate to source voltage to a voltage that biases said first N-channel MOSFET off when voltage of the second polarity is across the pair of circuit terminals.

5. A circuit as claimed in claim 2 wherein said means comprises a breakdown diode with the cathode coupled to the gate and the anode coupled to the source.

6. A circuit as claimed in claim 5 further comprising a resistor coupled between the cathode of the breakdown diode and the high potential terminal of the electrical load.

7. A circuit as claimed in claim 3 wherein said means comprises a solid state switch responsive to polarity of voltage across the pair of circuit terminals to couple the gate and source therethrough when voltage of the second polarity is across the pair of circuit terminals.

8. A circuit as claimed in claim 4 wherein said means comprises a breakdown diode with the cathode coupled to the gate and the anode coupled to the source.

9. A circuit as claimed in claim 4 wherein said means comprises a solid state switch responsive to polarity of voltage across the pair of circuit terminals to couple the gate and source therethrough when voltage of the second polarity is across the pair of circuit terminals.

10. A circuit as claimed in claim 4 wherein said means comprises a breakdown diode with the cathode coupled to the gate and the anode coupled to the source and a solid state switch responsive to polarity of voltage across the pair of circuit terminals to couple the gate and source therethrough when voltage of the second polarity is across the pair of circuit terminals.

11. A circuit as claimed in claim 7 wherein said solid state switch comprises a second N-channel MOSFET having a source coupled to the source of the first N-channel MOSFET, a gate coupled to the one of the pair of circuit terminals at a lower potential than the other of the pair of circuit terminals when voltage of the first polarity is across the pair of circuit terminals, and a drain coupled to the gate of the first N-channel MOSFET.

12. A circuit as claimed in claim 7 wherein said solid state switch comprises a bipolar transistor.

13. A circuit as claimed in claim 10 wherein said solid state switch comprises a second N-channel MOSFET having a source coupled to the source of the first N-channel MOSFET, a gate coupled to the one of the pair of circuit terminals at a lower potential than the other of the pair of circuit terminals when voltage of the first polarity is across the pair of circuit terminals, and a drain coupled to the gate of the first N-channel MOSFET.

14. A circuit as claimed in claim 10 wherein said solid state switch comprises a bipolar transistor.

15. A circuit as claimed in claim 11 further comprising:
    means effective to limit the second N-channel MOSFET gate to source voltage to a predetermined voltage when voltage of the second polarity is across the pair of circuit terminals.

16. A circuit as claimed in claim 15 wherein said means comprises a breakdown diode with the cathode coupled to the second N-channel MOSFET gate and the anode coupled to the second N-channel MOSFET source.

17. A circuit as claimed in claim 13 further comprising:
    means effective to limit the second N-channel MOSFET gate to source voltage to a predetermined voltage when voltage of the second polarity is across the pair of circuit terminals.

18. A circuit as claimed in claim 17 wherein said means comprises a breakdown diode with the cathode coupled to the second N-channel MOSFET gate and the anode coupled to the second N-channel MOSFET source.

19. A reverse voltage protection apparatus for a DC load normally powered by a DC voltage of a positive polarity, said DC load having a high side and a low side corresponding to a high and a low potential of said DC voltage of the positive polarity, said apparatus effective to allow current to flow through the DC load in one direction and block current flow through the DC load in the opposite direction, the improvement comprising:
    a series combination of an N-channel MOSFET and the DC load wherein the N-channel MOSFET is inversely coupled to the low side of the DC load, said series combination coupled across a pair of circuit nodes;
    said N-channel MOSFET having a gate coupled to the one of the pair of circuit nodes coupled to the high side of the DC load such that voltage of the positive polarity applied across the circuit nodes biases the N-channel MOSFET conductive and voltage of a negative polarity applied across the circuit nodes biases the N-channel MOSFET non-conductive.

20. A reverse voltage protection apparatus as claimed in claim 19 further comprising:
    said N-channel MOSFET further having a source coupled to a breakdown diode at the anode and the gate coupled to the breakdown diode at the cathode.

21. A reverse voltage protection apparatus as claimed in claim 20 further comprising a resistor coupled between the cathode of the breakdown diode and the one of the pair of circuit nodes coupled to the high side of the DC load.

22. A reverse voltage protection apparatus as claimed in claim 19 further comprising:
    said N-channel MOSFET further having a source; and,
    a solid state switch responsive to polarity of voltage across the pair of circuit nodes to substantially short the gate and source therethrough when voltage of a negative polarity is applied across the circuit nodes.

23. A reverse voltage protection apparatus as claimed in claim 19 further comprising:
    said N-channel MOSFET further having a source;
    a breakdown diode having an anode coupled to the source and a cathode coupled to the gate; and,
    a solid state switch responsive to polarity of voltage across the pair of circuit nodes to substantially short the gate and source therethrough when voltage of a negative polarity is applied across the circuit nodes.

24. A circuit as claimed in claim 15 further comprising a resistor coupled at one end to the cathode of the breakdown diode and at the other end to the high side of the DC load.

25. A circuit including an electrical load normally powered by voltage of a first polarity across a pair of circuit terminals, said circuit effective for preventing current flow through the electrical load caused by voltage of a second polarity opposite the first polarity across the pair of circuit terminals, the improvement comprising:
    said electrical load having high and low potential terminals, said high potential terminal coupled to the one of the pair of circuit terminals at a higher potential than the other of the pair of circuit terminals when voltage of the first polarity is across the pair of circuit terminals;
    a first N-channel MOSFET having a source coupled to the low potential terminal of the electrical load, a gate coupled to the high potential terminal of the electrical load, and a drain coupled to the one of the pair of circuit terminals at a lower potential than the other of the pair of circuit terminals when voltage of the first polarity is across the pair of circuit terminals; and,
    a second N-channel MOSFET having a source coupled to the source of the first N-channel MOSFET, a gate coupled to the one of the pair of circuit terminals at a lower potential than the other of the pair of circuit terminals when voltage of the first polarity is across the pair of circuit terminals, and a drain coupled to the gate of the first N-channel MOSFET.

26. A circuit as claimed in claim 25 further comprising a breakdown diode with the cathode coupled to the gate of the first N-channel MOSFET and the anode coupled to the source of the first N-channel MOSFET.

27. A circuit as claimed in claim 25 further comprising a breakdown diode with the cathode coupled to the gate of the second N-channel MOSFET and the anode coupled to the source of the second N-channel MOSFET.

28. A circuit as claimed in claim 25 further comprising a first breakdown diode with the cathode coupled to the gate of the first N-channel MOSFET and the anode coupled to the source of the first N-channel MOSFET, and a second breakdown diode with the cathode coupled to the gate of the second N-channel MOSFET and the anode coupled to the source of the second N-channel MOSFET.

* * * * *